United States Patent
Takahashi et al.

(10) Patent No.: US 7,804,216 B2
(45) Date of Patent: Sep. 28, 2010

(54) PERMANENT-MAGNET RELUCTANCE ELECTRICAL ROTARY MACHINE

(75) Inventors: Norio Takahashi, Kanagawa (JP);
Kazuto Sakai, Kanagawa (JP);
Masanori Arata, Kanagawa (JP);
Yutaka Hashiba, Kanagawa (JP);
Wataru Ito, Mie (JP); Motoyasu Mochizuki, Aichi (JP); Mikio Takabatake, Kanagawa (JP);
Masakatsu Matsubara, Mie (JP);
Takashi Hanai, Aichi (JP)

(73) Assignees: Kabushiki Kaisha Toshiba, Tokyo (JP);
Toshiba Industrial Products Manufacturing Corporation, Mie-gun (JP)

( * ) Notice: Subject to any disclaimer, the term of this patent is extended or adjusted under 35 U.S.C. 154(b) by 288 days.

(21) Appl. No.: 11/875,529

(22) Filed: Oct. 19, 2007

(65) Prior Publication Data
US 2008/0093944 A1    Apr. 24, 2008

(30) Foreign Application Priority Data
Oct. 20, 2006    (JP) .............................. 2006-286366

(51) Int. Cl.
*H02K 1/27*    (2006.01)
*H02K 21/14*    (2006.01)

(52) U.S. Cl. ............................ 310/156.56; 310/156.45; 310/156.55

(58) Field of Classification Search ............ 310/156.02, 310/156.56, 156.45
See application file for complete search history.

(56) References Cited

U.S. PATENT DOCUMENTS 5,684,352 A * 11/1997 Mita et al. ............. 310/156.53

(Continued)

FOREIGN PATENT DOCUMENTS

JP    2001-339919    12/2001

(Continued)

OTHER PUBLICATIONS

Kazuto Sakai, et al., "High Efficiency and High Performance Motor for Energy Saving in Systems", IEEE, 2000, 6 pages.

(Continued)

*Primary Examiner*—Burton Mullins
(74) *Attorney, Agent, or Firm*—Oblon, Spivak, McClelland, Maier & Neustadt, L.L.P.

(57) ABSTRACT

For an electrical reluctance rotary machine, a stator has a winding as an armature, and a rotor has permanent magnet implanting slots provided in a rotor core at lateral sides magnetic poles configured to produce reluctance torque along directions of magnetic flux passing through the magnetic poles to produce reluctance torque, and permanent magnets inserted in the permanent magnet implanting slots so as to cancel magnetic flux of the armature intersecting that magnetic flux, to control a magnetic field leaking at ends of the magnetic poles, having circumferential magnetic unevenness. The electrical reluctance rotary machine is configured to meet a relationship, such that $$1.6 \leq \frac{P \times W_{pm}}{R} \leq 1.9$$

where $W_{pm}$ [mm] is a width of permanent magnet, R [mm] is a radius of the rotor, and P is the number of poles.

4 Claims, 9 Drawing Sheets

U.S. PATENT DOCUMENTS

| | | | | |
|---|---|---|---|---|
| 5,811,904 | A * | 9/1998 | Tajima et al. | 310/156.45 |
| 5,818,139 | A * | 10/1998 | Yamagiwa et al. | 310/156.45 |
| 6,087,751 | A | 7/2000 | Sakai | |
| 6,274,960 | B1 | 8/2001 | Sakai et al. | |
| 6,329,734 | B1 | 12/2001 | Takahashi et al. | |
| 6,794,784 | B2 | 9/2004 | Takahashi et al. | |
| 6,803,692 | B2 | 10/2004 | Hattori et al. | |
| 7,057,322 | B2 | 6/2006 | Araki et al. | |
| 7,170,209 | B2 | 1/2007 | Araki et al. | |
| 7,385,328 | B2 * | 6/2008 | Melfi | 310/156.45 |
| 2002/0047435 | A1 * | 4/2002 | Takahashi et al. | 310/156.56 |
| 2002/0109429 | A1 * | 8/2002 | Hattori et al. | 310/156.53 |
| 2005/0200223 | A1 * | 9/2005 | Tajima et al. | 310/156.46 |
| 2007/0052313 | A1 | 3/2007 | Takahashi et al. | |
| 2007/0200447 | A1 * | 8/2007 | Adaniya et al. | 310/156.53 |

FOREIGN PATENT DOCUMENTS

| | | |
|---|---|---|
| JP | 2001-339922 | 12/2001 |
| JP | 2005-184957 | 7/2005 |
| JP | 2007-097387 | 4/2007 |
| WO | WO 2007/026802 A1 | 3/2007 |
| WO | WO 2007/055192 A1 | 5/2007 |

OTHER PUBLICATIONS

Hideki Hisada, et al., "AISIN AW New Full Hybrid Transmission for FWD Vehicles", SAE International, 2005, pp. 55-60.

* cited by examiner

PERMANENT-MAGNET RELUCTANCE ELECTRICAL ROTARY MACHINE

CROSS REFERENCE TO RELATED APPLICATION

The present application claims the benefit of priority under 35 U.S.C. §119 to Japanese Patent Application No. 2006-286366, filed on, Oct. 20, 2006, of which the contents are incorporated herein by reference.

BACKGROUND OF THE INVENTION

1. Field of the Invention

The present invention relates to an electrical rotary machine of a permanent magnet type in complex with permanent magnets, and particularly, to a permanent magnet type electrical rotary machine with high torque, high power, and enhanced reliability in a limited space.

2. Description of Related Art

Recent years have observed remarkable researches and developments in the art of permanent magnet, having developed permanent magnets with a high magnetic energy product, involving advancements in miniaturization and power enhancement of electrical rotary machines. In particular, for electrical rotary machines having such applications to vehicles as addressed to hybrid automobiles, there have been desiderata for higher efficiencies for enhanced fuel consumption, as well as for controlled gas emission. Further, for desirable increase in torque and enhancement of power to be achieved in a limited space in a narrow place for installation, there have been desiderata for increased quantities of permanent magnet, as well as for higher speeds. Accordingly, there has been a desideratum for rotor core strength along with high centrifugal forces, besides a desideratum for reduction of motor loss in consideration of occurrences of a thermal issue due to an increased density of loss.

FIG. 1 shows configuration of a rotor 10 of a permanent-magnet reluctance electrical rotary machine according to a related art. The rotor 10 has a rotor core 8 and a set of permanent magnets 2. The rotor core 8 is made to be easy of magnetization in a direction, and difficult in another direction. In other words, the rotor core 8 is configured for formation of magnetic unevenness, with a lamination of magnetic steel sheets that has permanent magnet implanting slots 1 for implanting permanent magnets 2, eight in number, in the direction of easy magnetization. The eight permanent magnet implanting slots 1 are arranged in a crossing relationship for formation of four salient poles. Namely, permanent magnet implanting slots 1 paired to be located at both sides of a nonmagnetic portion 3 have an interleaved portion therebetween as an interpolar portion that forms a magnetopolar recess. Further, in the permanent magnet implanting slots 1, there are arranged permanent magnets 2 magnetized so as to cancel magnetic flux of armature currents intersecting magnetic flux passing through magnetic pole portions to produce reluctance torque. That is, for permanent magnets 2 residing at both sides of a magnetic pole portion, their magnetization directions have identical senses to each other, and for permanent magnets 2 paired to be located at both sides of an interpolar portion, their magnetization directions have mutually opposite senses in a circumferential direction of the rotor 10.

In FIG. 1, there are illustrated lines of magnetic flux $\phi_d$ as a component of magnetic flux by armature currents with respect to d (direct)-axis in the direction along a magnetopolar axis of rotor core 8. In this direction, the core of magnetic pole portion constitutes a flux path. This magnetic path has a very small reluctance, and provides a magnetic configuration with a tendency for magnetic flux to travel.

FIG. 2 illustrates lines of magnetic flux $\phi_q$ as a component of magnetic flux by armature currents with respect to q (quadrature)-axis in the direction along an interconnecting axis between a center of the rotor 10 and a central part of an interpolar portion. Magnetic flux $\phi_q$ passing through the interpolar portion is produced along such a magnetic path that traverses an associated nonmagnetic portion 3 and permanent magnets 2 at both sides of the interpolar portion. The nonmagnetic portion 3 has a relative magnetic permeability of "1", and the permanent magnets 2 have a relative magnetic permeability of approximately "1", as well. As a result, magnetic flux $\phi_q$ by armature currents is reduced by the effect of high magnetic resistances.

Interlinking magnetic flux $\phi_m$ of permanent magnets 2 has an opposing distribution to the magnetic flux $\phi_q$ as a component of magnetic flux by armature currents with respect to q-axis in the direction of an interpolar center axis, and repulses magnetic flux $\phi_q$ by armature currents invading through an associated interpolar portion, canceling each other. At the interpolar air gaps, the density of air-gap flux produced by armature currents is reduced by magnetic flux $\phi_m$ of permanent magnets 2, and is greatly changed in comparison with the density of air-gap flux at the magnetic poles. That is, for the position of rotor 10, the air-gap flux density has a great change, involving a great change of magnetic energy. Further, there is a magnetic portion 11 that may magnetically short at the boundary between magnetic pole and interpolar section under a loaded condition, with a tendency to get magnetically strong saturated by load currents. The interpolar distribution of magnetic flux by permanent magnets 2 is thereby increased. The air-gap flux distribution thus has uneven profiles greatly changed by such magnetic flux and magnetic resistances of permanent magnets 2, thus involving significant great changes of magnetic energy, allowing for great output.

FIG. 3 shows a rotor configuration of a permanent-magnet reluctance electrical rotary machine disclosed in Japanese Patent Application Laid-Open Publication No. 2001-339919. A rotor core 8 has a part interleaved between permanent magnet implanting slots 1 located at both sides of a nonmagnetic portion 3, as an interpolar portion forming a magnetic recess. In the permanent magnet implanting slots 1, there are arranged permanent magnets 2 magnetized so as to cancel magnetic flux of armature currents intersecting magnetic flux passing through magnetic pole portions to produce reluctance torque. A nonmagnetic portion 3 is made by an air gap.

In the rotor core 8, each permanent magnet implanting slot 1 has a pair of permanent magnet positioning projections 4 projecting inside the slot. The permanent magnet positioning projections 4 have, at the bases, their R-cut (escaping) parts 5 provided on the planer side crossing a magnetizing direction of permanent magnet 2 at right angles, in opposition to the nonmagnetic portion 3.

Provision of such permanent magnet positioning projections 4 allows the permanent magnets 2 to be supported with secured degrees of strength at thinned portions (outer circumferential thinned parts 6, thinned bridging parts 7) where stresses are concentrated, to thereby afford an increased power output and higher speed. Further, the R-cut parts are thereby allowed to have a minimized value of stress, allowing for an increased revolution speed and enhanced reliability.

FIG. 4 is an enlarged radial sectional view depicting details in part of a rotor 10 of a permanent-magnet reluctance electrical rotary machine disclosed in Japanese Patent Application Laid-Open Publication No. 2001-339922. As shown in FIG. 4, the rotor 10 has a cavity 9 arranged in an interpolar q-axis direction to be difficult for magnetic flux to travel, and is configured so as to meet a relationship, such that:

$$PL/2\pi RWq_{ave} \geqq 130$$

where P is the number of poles, L [m] is a circumferential width of the cavity 9, R [m] is a radius of the rotor 10, and $Wq_{ave}$ [m] is an average of thickness Wq of a rotor core 8 along an outer side of the cavity 9 in a radial direction of the rotor.

Such being the case, the permanent-magnet reluctance electrical rotary machine of FIG. 4 has a cavity 9 (interpolar air gap) disposed at an outer circumferential side of permanent magnets 2 arranged in a V-form, with its configuration and dimensions being numerically limited to afford high torque, thereby enabling an increased power output and speed-variable operation.

SUMMARY OF INVENTION

However, in the related art shown in FIG. 3, the permanent-magnet reluctance electrical rotary machine employs permanent magnet positioning projections 4 for supporting permanent magnets 2 with secured degrees of rotor core strength to thereby afford an increased power and higher speed, and may achieve the higher speed with an increase in iron loss, harmonic loss or such, and a significant reduction in efficiency. Further, with an increased density of loss (density of heat dissipation) due to miniaturization and increased power, the electrical rotary machine may undergo a significant temperature rise involving a deteriorated insulation, thermal demagnetization of permanent magnets, and the like, with a reduced reliability, as a problem.

As for the rotor shown in FIG. 4, the cavity 9 (interpolar air gap) disposed at an outer circumferential side of permanent magnets 2 has its configuration and dimensions numerically limited to thereby afford high torque, and may have among others a high-speed revolution range achieved by a configuration and dimensions suitable for high torque and different from those meeting low-loss requirements, and may fail to successfully control motor losses, involving a reduced efficiency and lower reliability due to temperature rise, as a problem.

The present invention has been devised to solve such problems in the related art, and it is an object of the present invention to provide a permanent-magnet reluctance electrical rotary machine allowing motor losses to be reduced with maintained degrees of rotor strength to endure high revolution speeds, thereby affording an increased efficiency and a controlled heat dissipation of electrical rotary machine, allowing for high torque, high power, and enhanced reliability in a limited space.

To solve the above-noted object of the present invention, a first aspect of the present invention provides a permanent-magnet reluctance electrical rotary machine comprises a stator having a winding as an armature, and a rotor having a permanent magnet implanting slot provided in a rotor core at a lateral side of a magnetic pole configured to produce reluctance torque along a direction of magnetic flux passing through the magnetic pole to produce reluctance torque, and a permanent magnet inserted in the permanent magnet implanting slot so as to cancel magnetic flux of the armature intersecting that magnetic flux, to control a magnetic field leaking at an end of the magnetic pole, having circumferential magnetic unevenness, and the electrical rotary machine is configured to meet a relationship, such that $$1.6 \leq \frac{P \times W_{pm}}{R} \leq 1.9$$

where $W_{pm}$ [mm] is a width of the permanent magnet, R [mm] is a radius of the rotor, and P is a pole number.

According to the first aspect of the present invention, the width of the permanent magnet, outer-diametrical radius of the rotor, and pole number are adjustable for degrees of rotor core to be maintained to endure high revolution speeds, allowing for an enhanced efficiency with controlled motor losses.

According to a second aspect of the present invention, a permanent-magnet reluctance electrical rotary machine comprises a stator having a winding as an armature, and a rotor having a permanent magnet implanting slot provided in a rotor core at a lateral side of a magnetic pole configured to produce reluctance torque along a direction of magnetic flux passing through the magnetic pole to produce reluctance torque, and a permanent magnet inserted in the permanent magnet implanting slot so as to cancel magnetic flux of the armature intersecting that magnetic flux, to control a magnetic field leaking at an end of the magnetic pole, having circumferential magnetic unevenness, and the electrical rotary machine is configured to meet a relationship, such that $$0.55 \leq \frac{P \times t_{pm}}{R} \leq 0.7$$

where $t_{pm}$ [mm] is a thickness of the permanent magnet, R [mm] is a radius of the rotor, and P is a pole number.

According to the second aspect of the present invention, the thickness of the permanent magnet, outer-diametrical radius of the rotor, and pole number are adjustable, allowing for an enhanced efficiency with controlled losses, whether in a region for high-speed operation or in a region for low-speed operation.

According to a third aspect of the present invention, a permanent-magnet reluctance electrical rotary machine comprises a stator having a winding as an armature, and a rotor having a permanent magnet implanting slot provided in a rotor core at a lateral side of a magnetic pole configured to produce reluctance torque along a direction of magnetic flux passing through the magnetic pole to produce reluctance torque, and a permanent magnet inserted in the permanent magnet implanting slot so as to cancel magnetic flux of the armature intersecting that magnetic flux, to control a magnetic field leaking at an end of the magnetic pole, having circumferential magnetic unevenness, and for a magnet angle α as an open angle defined by an axial center of the rotor and vertexes of corners at rotor outer-circumferential sides of two permanent magnets arranged in a V-form, the magnet angle α is set to be 82 degrees or more and 92 degrees or less in terms of an electric angle.

According to the third aspect of the present invention, the magnet angle defined by an axial center of the rotor and vertexes of corners at rotor outer-circumferential sides of two permanent magnets arranged in a V-form is adjustable, allowing for an enhanced efficiency with controlled motor losses.

According to a fourth aspect of the present invention, a permanent-magnet reluctance electrical rotary machine comprises a stator having a winding as an armature, and a rotor having a permanent magnet implanting slot provided in a rotor core at a lateral side of a magnetic pole configured to produce reluctance torque along a direction of magnetic flux passing through the magnetic pole to produce reluctance torque, and a permanent magnet inserted in the permanent magnet implanting slot so as to cancel magnetic flux of the armature intersecting that magnetic flux, to control a magnetic field leaking at an end of the magnetic pole, having circumferential magnetic unevenness, and for a magnetopolar angle β as an open angle defined by an axial center of the rotor and magnet-lateral outer-circumferential side air gap portions neighboring permanent magnets neighboring each other with the magnetic pole in between, the magnetopolar angle β is set to be 26 degrees or more and 58 degrees or less in terms of an electric angle.

According to the fourth aspect of the present invention, the magnetopolar angle defined by an axial center of the rotor and magnet-lateral outer-circumferential side air gap portions neighboring permanent magnets neighboring each other with the magnetic pole in between is adjustable, allowing for a maintained high-torque performance and an enhanced efficiency with controlled motor losses.

According to a fifth aspect of the present invention, a permanent-magnet reluctance electrical rotary machine comprises a stator having a winding as an armature, and a rotor having a permanent magnet implanting slot provided in a rotor core at a lateral side of a magnetic pole configured to produce reluctance torque along a direction of magnetic flux passing through the magnetic pole to produce reluctance torque, and a permanent magnet inserted in the permanent magnet implanting slot so as to cancel magnetic flux of the armature intersecting that magnetic flux, to control a magnetic field leaking at an end of the magnetic pole, having circumferential magnetic unevenness, and for an interpolar air-gap angle γ as an open angle defined by an axial center of the rotor and a pair of circumferential ends of an interpolar air gap portion disposed at a rotor outer-circumferential side of a substantially intermediate region between two permanent magnets arranged in a V-form, the interpolar air-gap angle γ is set to be 5 degrees or more and 35 degrees or less in terms of an electric angle.

According to the fifth aspect on the present invention, the interpolar air-gap angle defined by an axial center of the rotor and a pair of circumferential ends of an interpolar air gap portion disposed at a rotor outer-circumferential side of a substantially intermediate region between two permanent magnets arranged in a V-form is adjustable, allowing for an enhanced efficiency with controlled motor losses.

According a sixth aspect of the present invention, in the permanent-magnet reluctance electrical rotary machine, the rotor has eight poles, and the stator has forty-eight slots.

According to the sixth aspect of the present invention, an optimal selection is made of rotor pole number and stator slot number, allowing for provision of most favorable motor characteristics (torque, loss, and stress).

DETAILED DESCRIPTION OF THE EMBODIMENTS

There will be detailed the preferred embodiments of the present invention, with reference to the accompanying drawings.

First Embodiment

Figure 1:
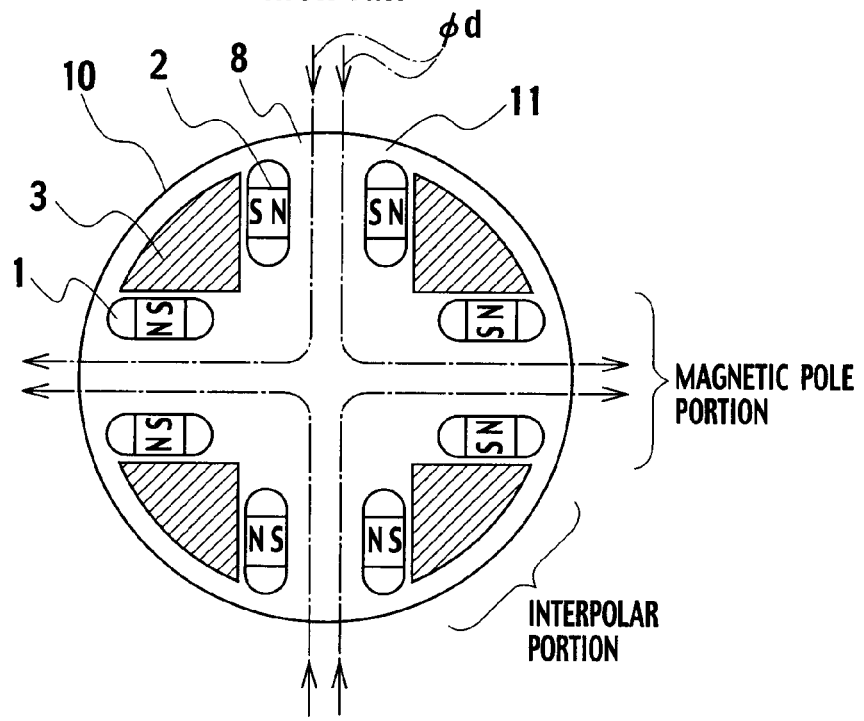
FIG. 1 is a rotor-diametrical sectional view of a permanent-magnet reluctance electrical rotary machine according to a related art.
Figure 2:
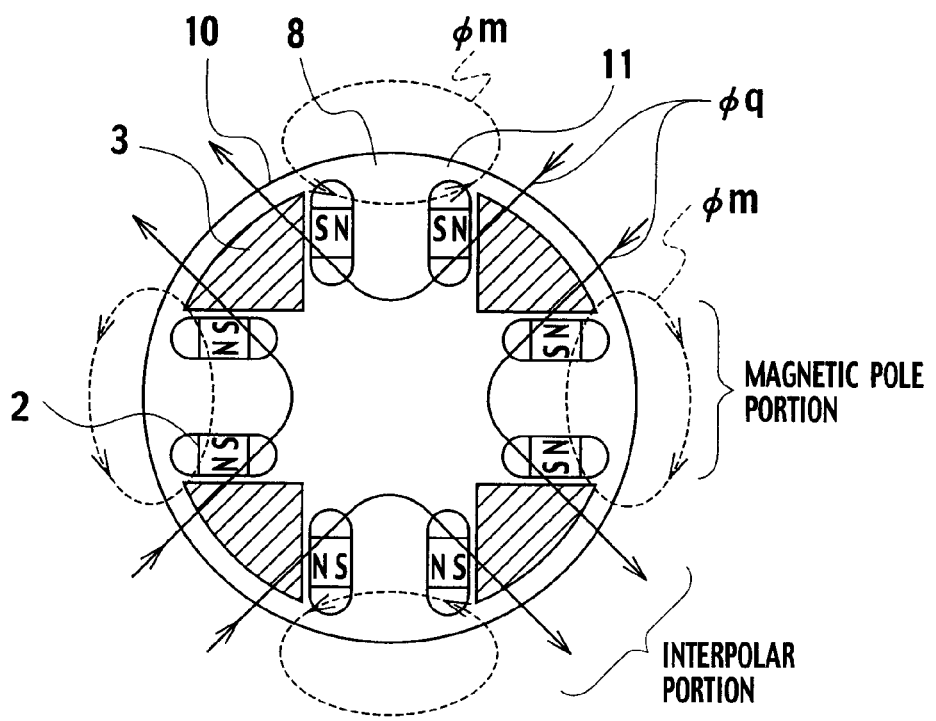
FIG. 2 is a rotor-diametrical sectional view of the permanent-magnet reluctance electrical rotary machine according to the related art.
Figure 3:
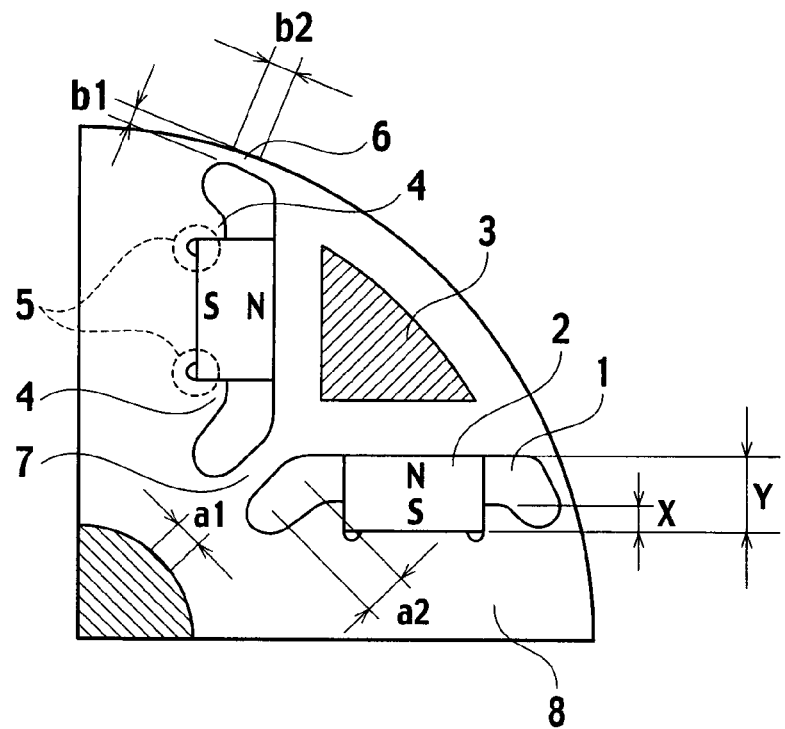
FIG. 3 is an enlarged rotor-diametrical sectional view of a permanent-magnet reluctance electrical rotary machine according to a related art.
Figure 4:
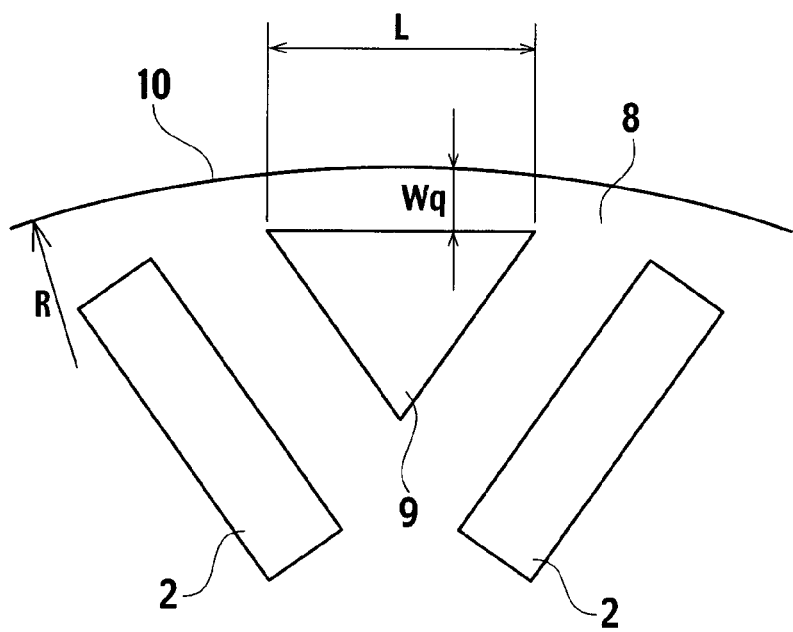
FIG. 4 is an enlarged diametrical sectional view depicting a detailed configuration in part of a rotor of a permanent-magnet reluctance electrical rotary machine according to a related art.
Figure 5:
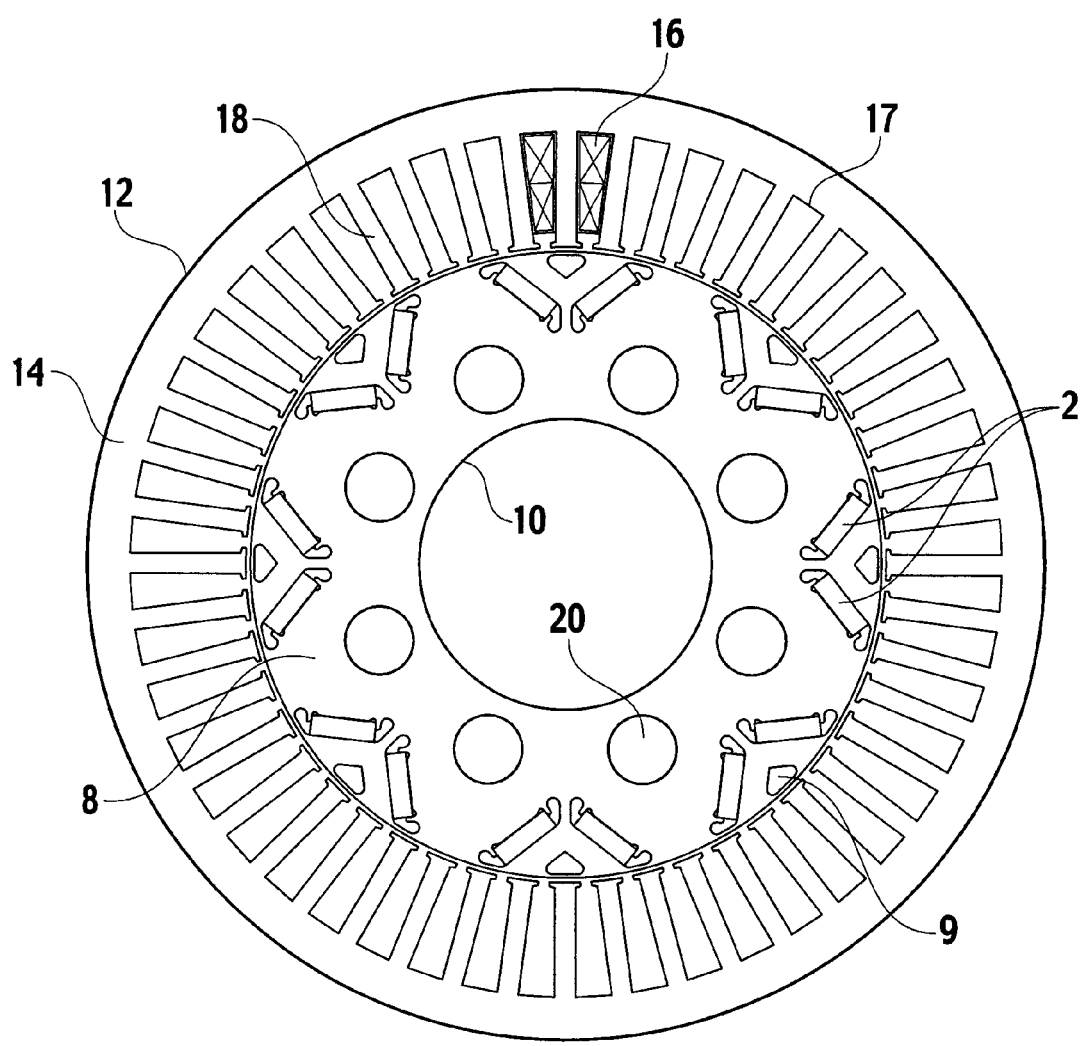
FIG. 5 is a diametrical sectional view of a permanent-magnet reluctance electrical rotary machine according to a first embodiment of the present invention.

Description is now made of a first embodiment of the present invention. FIG. 5 is a diametrical sectional view of a permanent-magnet reluctance electrical rotary machine according to the first embodiment, and FIG. 6, an enlarged diametrical sectional view of the permanent-magnet reluctance electrical rotary machine according to the first embodiment. Like or equivalent elements to FIG. 1 to FIG. 4 are designated by like reference characters, eliminating redundancy.

Description is now made of configuration of the present embodiment. A stator 12 has a stator core 14 and a combination of armature windings 16. The stator core 14 is made up by laminations of magnetic steel sheets, and has at their inner circumferential sides a set of stator slots 17 for accommodating armature windings 16, and a set of stator teeth 18 fronting a rotor 10. The stator slots are forty-eight in total. The rotor 10, installed inside the stator 12, has a rotor core 8, a plurality of permanent magnets 2, and a plurality of cooling holes 20. There is an air gap extending between rotor 10 and stator teeth 18.

Figure 6:
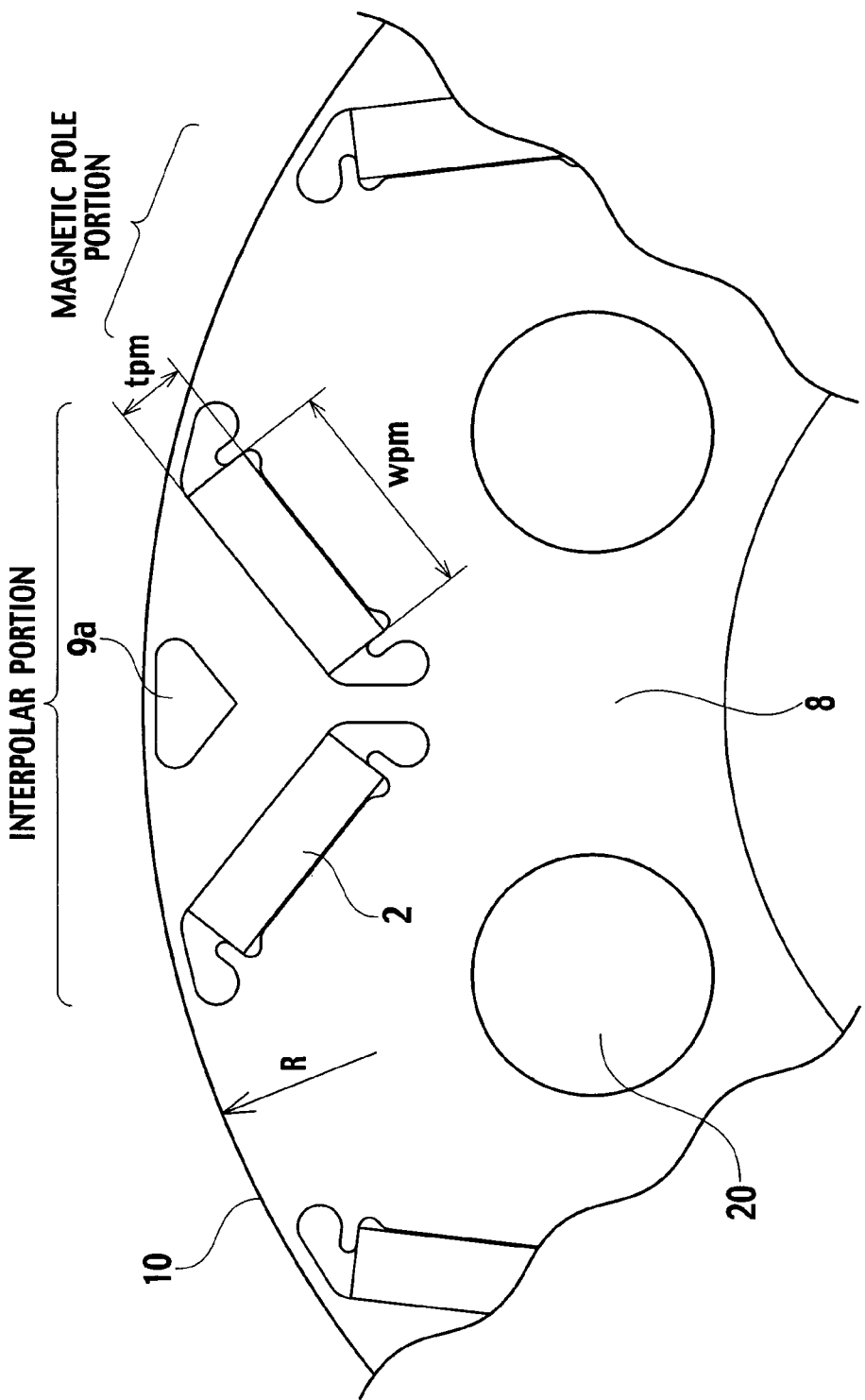
FIG. 6 is an enlarged diametrical sectional view of a rotor of the permanent-magnet reluctance electrical rotary machine according to the first embodiment of the present invention.

FIG. 6 illustrates an enlarged diametrical section of the rotor 10 shown in FIG. 5. The rotor core 8 is composed of laminations of magnetic steel sheets, and has a magnetization-easy direction and a magnetization-difficult direction alternately appearing in a circumferential direction about an axis of rotation. In other words, the rotor core 8 is configured to make circumferential magnetic unevenness, with a set of laminations of magnetic steel sheets having permanent magnet implanting slots 1 formed therein for implanting permanent magnets 2, at lateral sides of each magnetic pole configured to produce reluctance torque, along (a magnetization-easy direction as) a direction of magnetic flux passing through the magnetic pole to produce reluctance torque.

In the embodiment of FIG. 5, the rotor 10 has eight salient poles formed by such arrangement of permanent magnet implanting slots 1. Namely, permanent magnet implanting slots 1 paired to be located at both sides of an interpolar air-gap portion 9a have an interleaved portion therebetween as an interpolar portion that forms a magnetopolar recess. Further, those permanent magnet implanting slots 1 each respectively have a permanent magnet 2 inserted therein so as to cancel magnetic flux of armature currents that intersects magnetic flux passing through an associated magnetic pole portion to produce reluctance torque, and thereby adapted to suppress a leaking magnetic field at an end of the magnetic pole portion. That is, for permanent magnets 2 residing at both sides of a magnetic pole portion, their magnetization directions have identical senses to each other, and for permanent magnets 2 paired to be located at both sides of an interpolar portion, their magnetization directions have mutually opposite senses in a circumferential direction of the rotor 10.

The rotor 10 thus has circumferential magnetic concavo-convex, and is adapted to revolve about a rotor shaft with a revolving magnetic field by electric currents conducted through armature windings 16 installed on the stator core 14.

Each permanent magnet 2 is arranged so as to meet a relationship, such that $$1.6 \leq \frac{P \times W_{pm}}{R} \leq 1.9$$

where $W_{pm}$ [mm] is a width of the permanent magnet 2, R [mm] is a radius of the rotor 10, and P is a pole number. In the present embodiment, for the rotor 10, the pole number is set to eight.

Further, the permanent magnet 2 is arranged so as to meet another relationship, such that $$0.55 \leq \frac{P \times t_{pm}}{R} \leq 0.7$$

where $t_{pm}$ [mm] is a thickness of the permanent magnet 2, R [mm] is the radius of the rotor 10, and P is the pole number.

Figure 7:
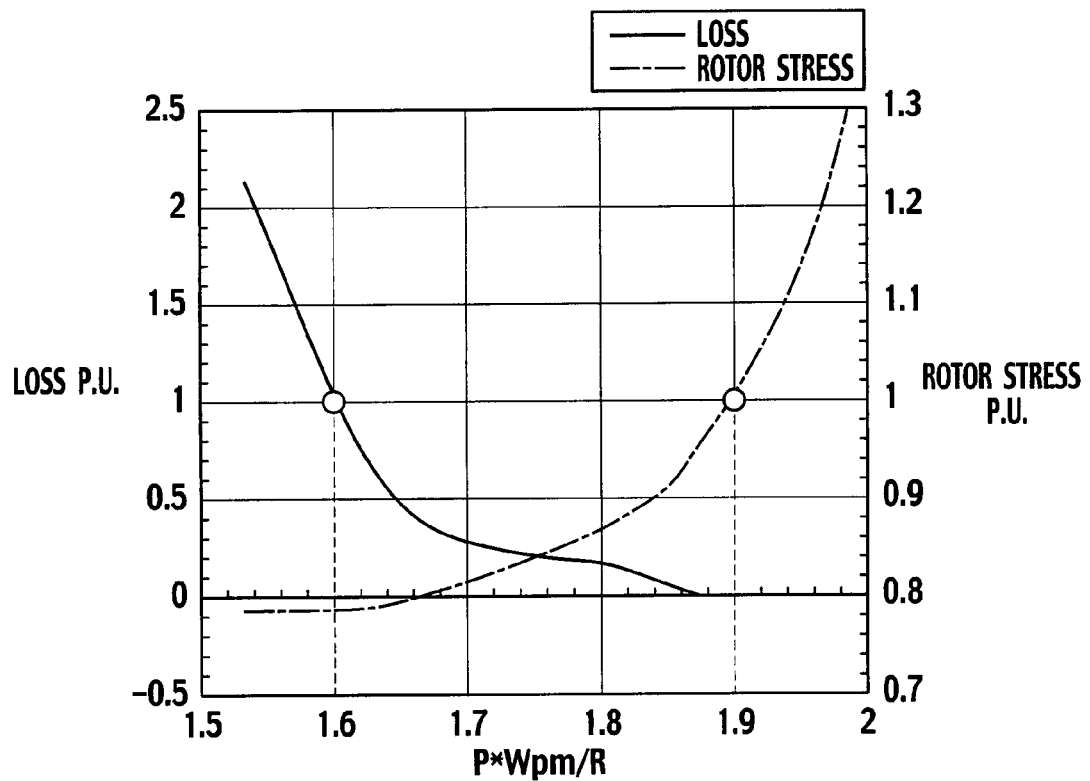
FIG. 7 is a graph of characteristics of an electrical rotary machine loss and a rotor stress depending on $P \times W_{p\,m}/R$ of the permanent-magnet reluctance electrical rotary machine according to the first embodiment of the present invention.

Description is now made of functions of the present embodiment. FIG. 7 shows, in a graph, characteristics of an electrical rotary machine loss and a rotor stress depending on a PU (per-unit) value of total magnet width ($P \times W_{p\ m}/R$), i.e., a value of the permanent magnet width $W_{p\ m}$ multiplied by the pole number P and divided by the rotor's radius R. As this PU value is increased, that is, as the rotor 10 has an increased proportion of permanent magnet width $W_{p\ m} \times 2 \times$ pole number P (=total magnet width) to an outside diameter (=R×2) of the rotor 10, the rotor stress also is proportionally increased. For the rotor strength to be secured to endure high-speed revolutions, the rotor stress should be controlled low. The rotor stress gets 1.0, when the value of $P \times W_{p\ m}/R$ is 1.9. It is noted that the rotor stress as well as the loss is represented in a PU system, where it takes a dimensionless value. For each of rotor stress and loss, this embodiment takes a representative characteristic value of products in a related art as a unit (white circle in the figure). It thus constitutes a target of development to get PU values under 1.0.

On the other hand, as the PU value of total magnet width ($P \times W_{p\ m}/R$) is decreased, that is, as the rotor 10 has a decreased proportion of permanent magnet width $W_{p\ m} \times 2 \times$ pole number P (=total magnet width) to the outside diameter (=R×2) of the rotor 10, the electrical rotary machine loss is increased in inverse proportion. The loss gets 1.0, when the value of $P \times W_{p\ m}/R$ is 1.6.

It thus so follows that 1.9 is a proportion of the permanent magnet width $W_{p\ m} \times$ pole number P to the rotor's radius R that permits the rotor core to have a desirable strength with a minimized loss. Further, by configuration having the value of $P \times W_{p\ m}/R$ within a range of 1.6 or more and 1.9 or less, both electrical rotary machine loss and rotor loss can be controlled under 1.0 in terms of PU value.

Figure 8:
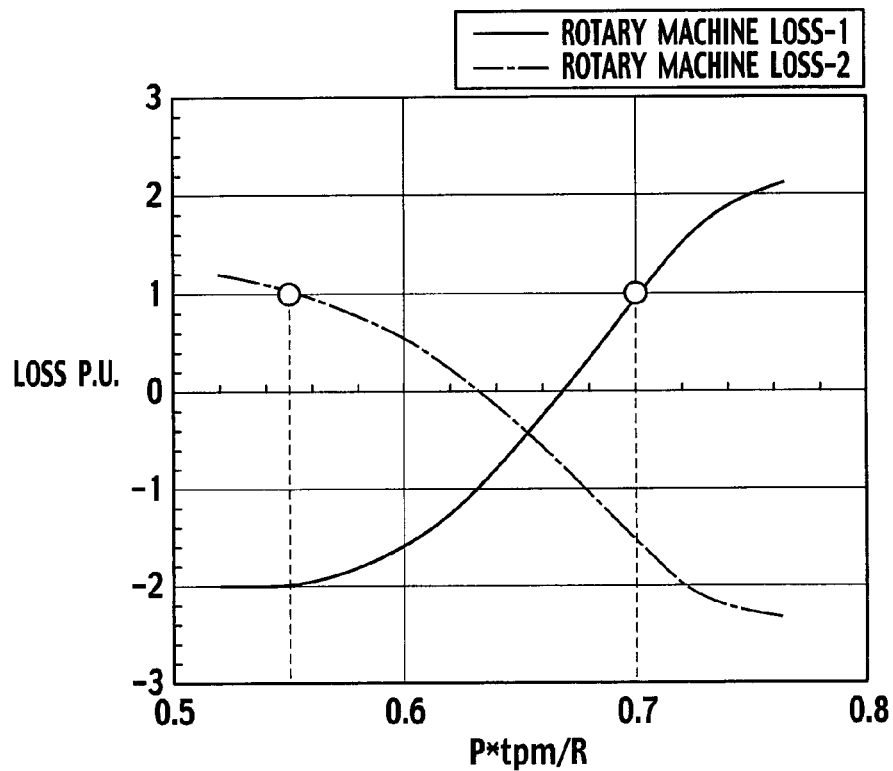
FIG. 8 is a graph of characteristics of electrical rotary machine losses depending on $P \times t_{p\,m}/R$ of the permanent-magnet reluctance electrical rotary machine according to the first embodiment of the present invention.

FIG. 8 shows, in a graph, characteristics of electrical rotary machine losses depending on a PU value of total magnet thickness ($P \times t_{p\ m}/R$)), i.e., a value of the permanent magnet thickness $t_{p\ m}$ multiplied by the pole number P and divided by the rotor's radius R. As this PU value is increased, that is, as the rotor 10 has an increased proportion of permanent magnet thickness $t_{p\ m} \times 2 \times$ pole number P (=total magnet thickness) to the outside diameter (=R×2) of the rotor 10, the electrical rotary machine whose iron loss increases mainly in a high-speed operational region has a proportionally increased rotary machine loss-1. This loss gets 1.0, when the value of $P \times t_{p\ m}/R$ is 0.7.

On the other hand, as the PU value of total magnet thickness ($P \times t_{p\ m}/R$) is decreased, that is, as the rotor 10 has a decreased proportion of permanent magnet thickness $t_{p\ m} \times 2 \times$ pole number P (=total magnet thickness) to the outside diameter (=R×2) of the rotor 10, the electrical rotary machine whose copper loss increases mainly in a low-speed operational region has an inverse-proportionally increased rotary machine loss-2. This loss gets 1.0, when the value of $P \times t_{p\ m}/R$ is 0.55.

Therefore, for values of $P \times t_{p\ m}/R$ within a range of 0.55 or more and 0.7 or less, the electrical rotary machine can have a suppressed rotary machine loss-1 in the high-speed operational range, and a reduced rotary machine loss-2 in the low-speed operational range.

Figure 9:
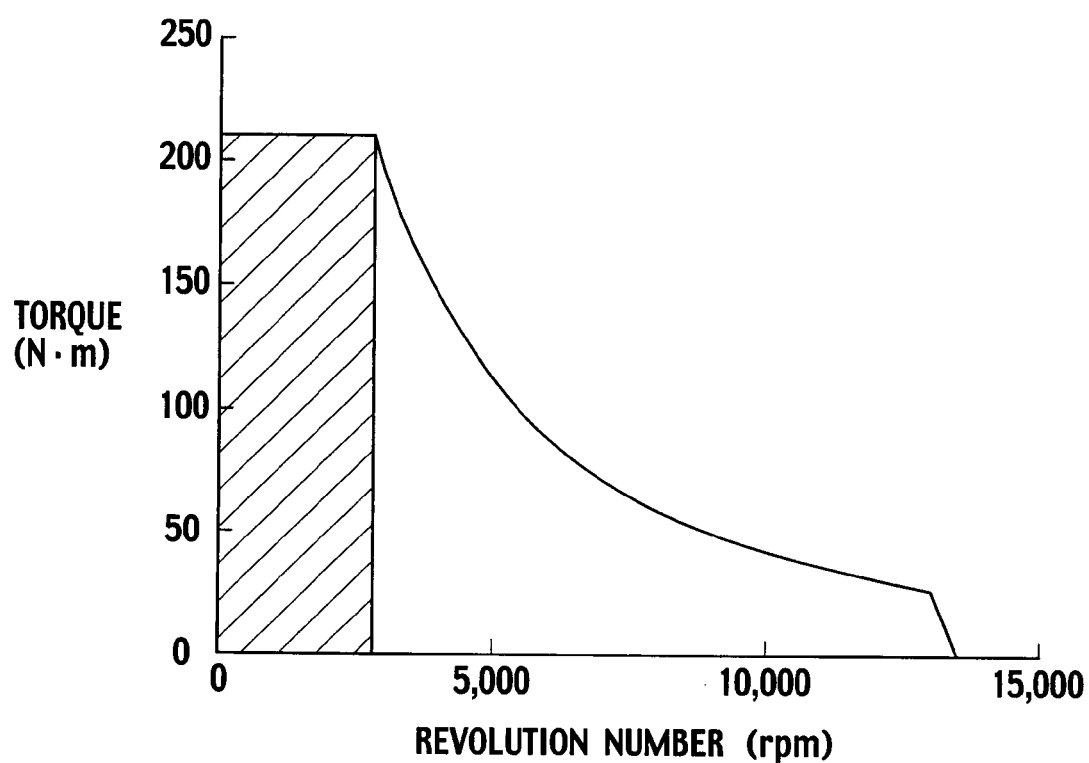
FIG. 9 is a graph of a driving characteristic of the permanent-magnet reluctance electrical rotary machine according to the first embodiment of the present invention.

Description is now made of the high-speed operational range and the low-speed operational range. FIG. 9 shows, in a graph, a driving characteristic of the permanent-magnet reluctance electrical rotary machine according to the present embodiment. A shadowed constant-torque region within a range of revolution numbers under approximately 3,000 rpm is called "low-speed operational range", where torque and currents are high, and the proportion of copper loss is increased. As the revolution number is increased, torque is gradually reduced in a region of revolution numbers over approximately 3,000 rpm, which is called "high-speed operational range". This region needs suppression of flux to be effected by a weak field control from the stator 12 side, and has an increased proportion of iron loss due to harmonic flux.

According to the first embodiment of the present invention, the permanent-magnet reluctance electrical rotary machine is allowed, within a range of values of $P \times W_{p\ m}/R$ of 1.9 or less, to have maintained degrees of rotor strength, needing no anxieties such as about a rupture of the rotor 10, affording an enhanced reliability. Within a range of values of $P \times W_{p\ m}/R$ of 1.6 or more, the electrical rotary machine is allowed to have a reduced rotary machine loss, and an enhanced rotary machine efficiency. Further, it has suppressed heat dissipation due to rotary machine loss, to be kept free of insulation deterioration of windings or thermal demagnetization of permanent magnets, thus affording an enhanced reliability.

Further, the permanent-magnet reluctance electrical rotary machine is allowed, within a range of values of $P \times t_{p\ m}/R$ of 0.7 or less, to have a reduced rotary machine loss in the high-speed operational range, and within a range of values of $P \times t_{p\ m}/R$ of 0.55 or more, to have a reduced rotary machine loss in the low-speed operational range. Therefore, within a range of values of $P \times t_{p\ m}/R$ of 0.55 or more and 0.7 or less, the electrical rotary machine is allowed to have an enhanced rotary machine efficiency. Further, it has suppressed heat dissipation due to rotary machine losses, to be kept free of insulation deterioration of windings or thermal demagnetization of permanent magnets, thus affording an enhanced reliability.

Further, for the permanent-magnet reluctance electrical rotary machine of which the pole number of rotor 10 is eight, and the stator slots 17 are forty-eight in number, optimal rotor pole number and stator slot number are selected, allowing for most favorable motor characteristics (torque, loss, and stress).

Second Embodiment

Figure 10:
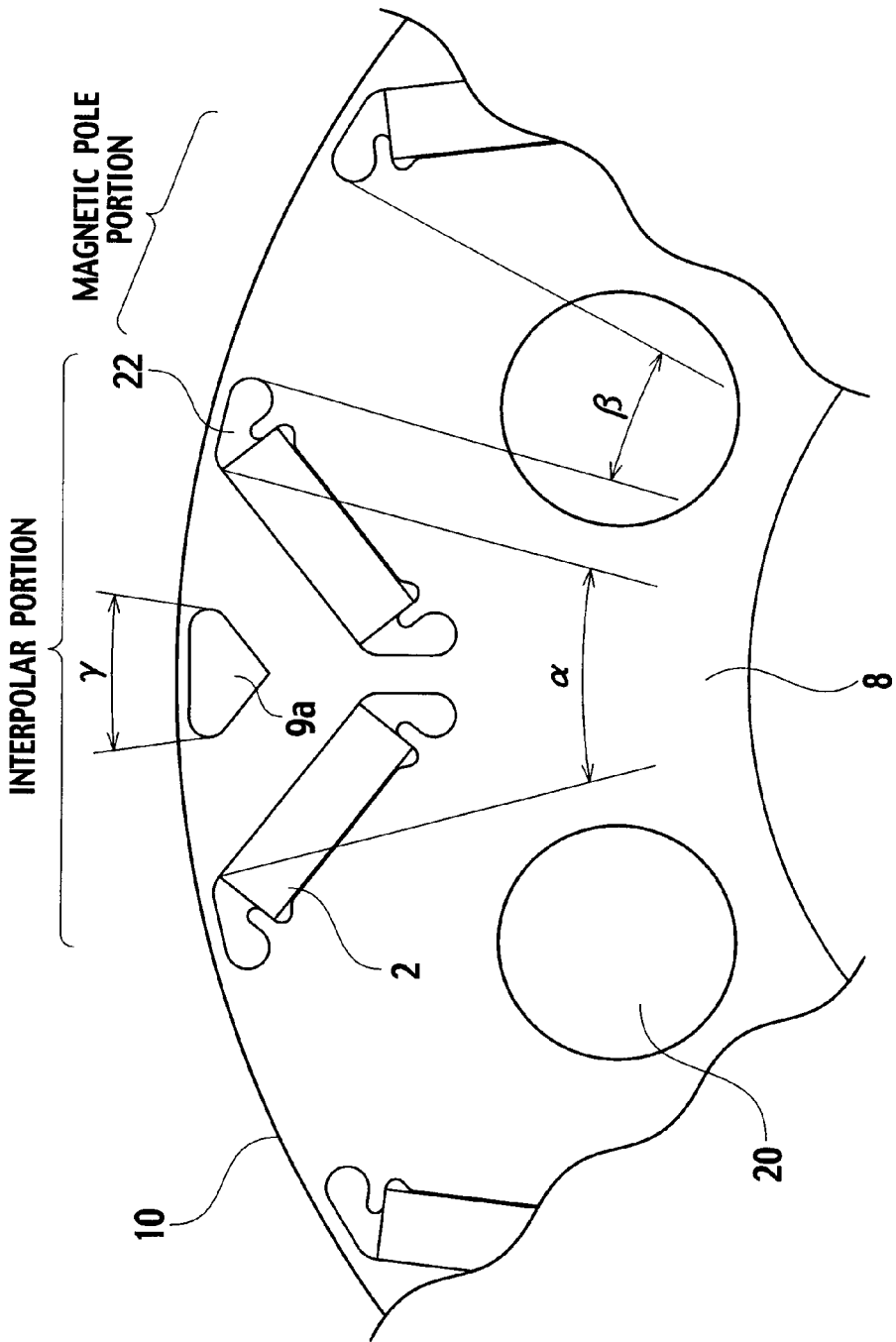
FIG. 10 is an enlarged diametrical sectional view of a rotor of a permanent-magnet reluctance electrical rotary machine according to a second embodiment of the present invention.

Description is now made of a second embodiment of the present invention. FIG. 10 is an enlarged diametrical sectional view of a permanent-magnet reluctance electrical rotary machine according to the second embodiment. Like or equivalent elements to FIG. 5 or FIG. 6 are designated by like reference characters, eliminating redundancy.

For basic configuration, the second embodiment is identical to the first embodiment. A magnet angle α is now defined as an open angle made by an axial center of a rotor and vertexes of corners at rotor outer-circumferential sides of two permanent magnets 2 arranged in a V-form. The magnets 2 are arranged so as to meet a relationship by which the magnet angle α is set within a range of 82 degrees or more and 92 degrees or less in terms of an electric angle.

The electric angle is defined relative to an angle between N pole and S pole neighboring each other to be electrical π [rad]. Letting P be a pole number, the electric angle has a value of P/2 of a normal (mechanical) angle. In this embodiment, the pole number is eight, and the electric angle range of 82 degrees or more and 92 degrees or less corresponds to a mechanical angle range of 20.5 degrees or more and 23 degrees or less.

Further, a magnetopolar angle β is defined as an open angle made by the axial center of the rotor and magnet-lateral outer-circumferential side air gap portions 22 neighboring permanent magnets neighboring each other with a magnetic pole portion in between. The magnet-lateral outer-circumferential side air gap portions 22 are arranged so as to meet a relationship by which the magnetopolar angle β is set within a range of 26 degrees or more and 58 degrees or less in terms of the electric angle.

Still further, an interpolar air-gap angle γ is defined as an open angle made by the axial center of the rotor and a pair of circumferential ends of an interpolar air gap portion 9a disposed at a rotor outer-circumferential side of a substantially intermediate region between two permanent magnets arranged in a V-form. The interpolar air gap portion 9a is arranged so as to meet a relationship by which the interpolar air-gap angle γ is set within a range of 5 degrees or more and 35 degrees or less in terms of the electric angle.

Figure 11:
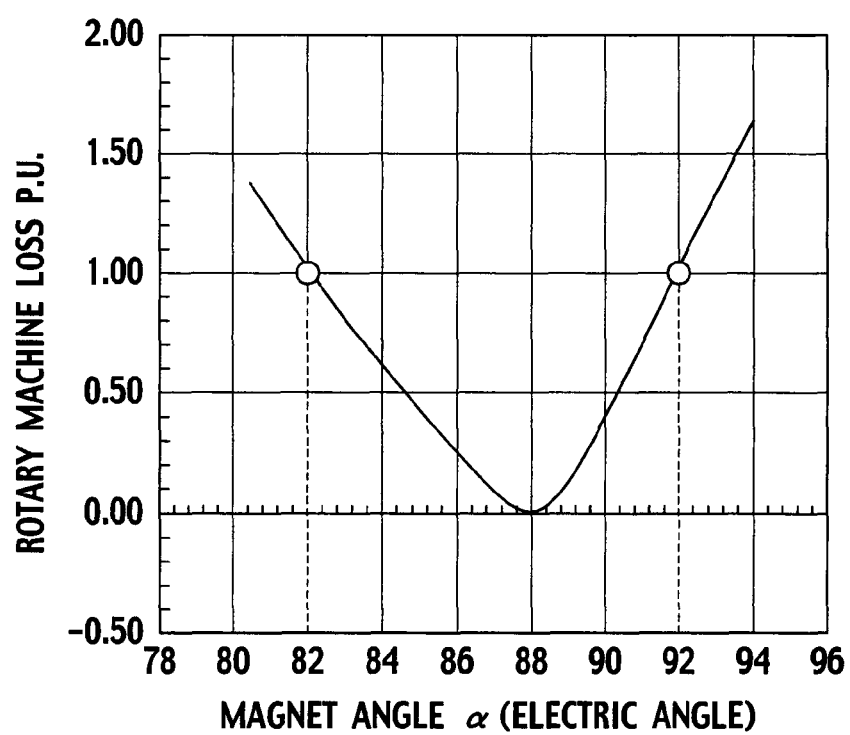
FIG. 11 is a graph of a characteristic of an electrical rotary machine loss depending on a magnet angle α of the permanent-magnet reluctance electrical rotary machine according to the second embodiment of the present invention.

Description is now made of functions of the present embodiment configured as described. FIG. 11 shows, in a graph, a characteristic of an electrical rotary machine loss depending on the magnet angle α. As the magnet angle α is changed in terms of electric angle as in FIG. 11, the permanent-magnet reluctance electrical rotary machine has a minimal electrical rotary machine loss in a vicinity of a magnet angle α of 88 degrees in terms of electric angle. The rotary machine loss increases as the magnet angle α departs from the vicinity of 88 degrees, and gets 1.0 when the magnet angle α has come to positions of 82 degrees and 92 degrees.

Figure 12:
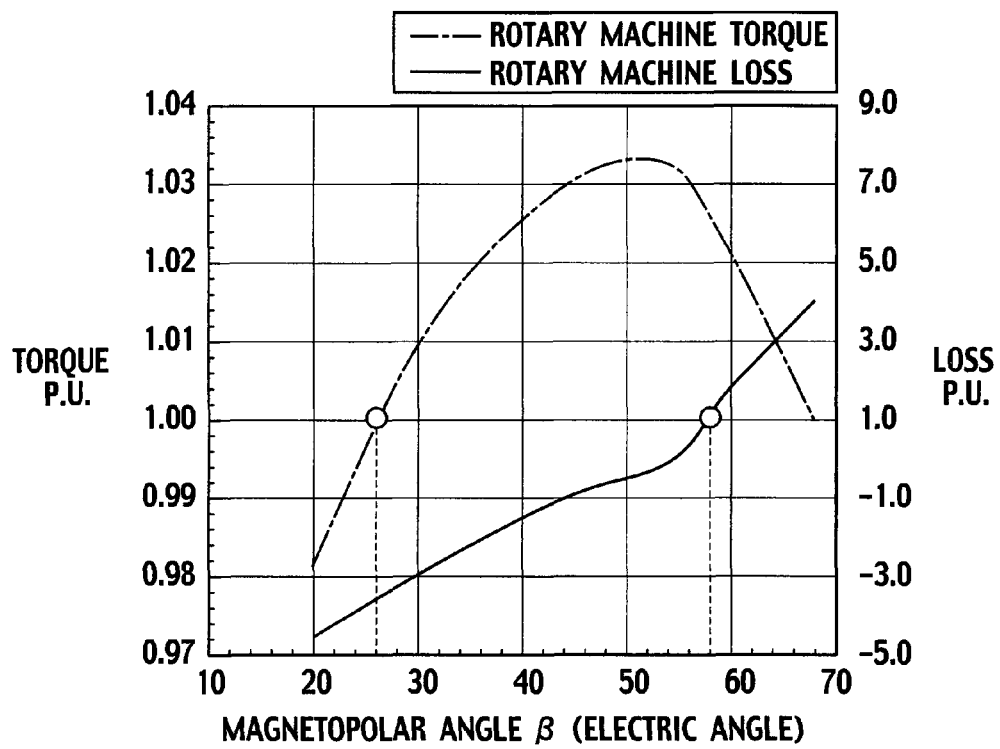
FIG. 12 is a graph of characteristics of an electrical rotary machine loss and electrical rotary machine torque depending on a magnetopolar angle β of the permanent-magnet reluctance electrical rotary machine according to the second embodiment of the present invention.

FIG. 12 shows, in a graph, characteristics of an electrical rotary machine loss and electrical rotary machine torque depending on the magnetopolar angle β. As the magnetopolar angle β is changed as in FIG. 12, the permanent-magnet reluctance electrical rotary machine has maximal torque in a vicinity of a magnetopolar angle β of 50 degrees in terms of electric angle. The torque decreases as the magnetopolar angle β departs from the vicinity of 50 degrees, and gets 1.0 when the magnetopolar angle β has come to positions of 26 degrees and 68 degrees.

The rotary machine loss increases, as the magnetopolar angle β is increased, i.e., the proportion of magnet width to an outer circumference of the rotor becomes higher. The rotary machine loss gets 1.0, when the magnetopolar angle β is 58 degrees in terms of electric angle. It is thus allowed, within a range of magnetopolar angles β of 26 degrees or more and 58 degrees or less, to have a reduced rotary machine loss with maintained torque over a prescribed value.

Figure 13:
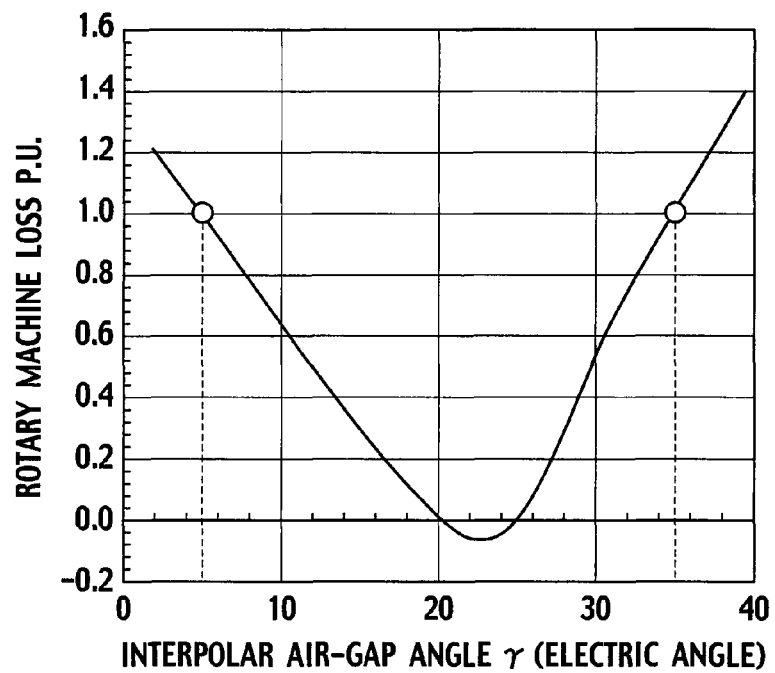
FIG. 13 is a graph of a characteristic of an electrical rotary machine loss depending on an interpolar air-gap angle γ of the permanent-magnet reluctance electrical rotary machine according to the second embodiment of the present invention.

FIG. 13 shows, in a graph, a characteristic of an electrical rotary machine loss depending on the interpolar air-gap angle γ. As the interpolar air-gap angle γ is changed as in FIG. 13, the permanent-magnet reluctance electrical rotary machine has a minimal electrical rotary machine loss in a vicinity of an interpolar air-gap angle γ of 23 degrees in terms of electric angle. The rotary machine loss increases as the interpolar air-gap angle γ departs from the vicinity of 23 degrees, and gets 1.0 when the interpolar air-gap angle γ has come to positions of 5 degrees and 35 degrees. It therefore is necessary for a reduced rotary machine loss to set the interpolar air-gap angle γ within a range of 5 degrees or more and 35 degrees or less.

According to the second embodiment described, the permanent-magnet reluctance electrical rotary machine has a magnet angle α set within a range of 82 degrees or more and 92 degrees or less in terms of electric angle, and is allowed to have a reduced electrical rotary machine loss, allowing for like effects to the first embodiment.

Further, the permanent-magnet reluctance electrical rotary machine has a magnetopolar angle β set within a range of 26 degrees or more and 58 degrees or less in terms of electric angle, and is allowed to have higher torque than a prescribed magnitude, allowing for a maintained high-power and high-torque performance. Concurrently, it is allowed to have a reduced electrical rotary machine loss, allowing for like effects to the first embodiment.

Still further, the permanent-magnet reluctance electrical rotary machine has an interpolar air-gap angle γ set within a range of 5 degrees or more and 35 degrees or less in terms of electric angle, and is allowed to have a reduced electrical rotary machine loss, allowing for like effects to the first embodiment.

As will be seen from the foregoing description, the present invention provides a permanent-magnet reluctance electrical rotary machine applicable to a vehicle having incorporated an electrical rotary machine or a drive power source including an electrical rotary machine.

While preferred embodiments of the present invention have been described using specific terms, such description is for illustrative purposes, and it is to be understood that changes and variations may be made without departing from the scope of the following claims.

What is claimed is:

1. A permanent-magnet reluctance electrical rotary machine comprising:
   a stator having a winding as an armature; and
   a rotor including a pair of permanent magnet implanting slots provided in a rotor core at both sides of a magnetic pole configured to produce reluctance torque along a direction of magnetic flux passing through the magnetic pole to produce reluctance torque, and permanent magnets inserted in the permanent magnet implanting slots, respectively, magnetization directions of the permanent magnets residing at both sides of the magnetic pole identical to each other, magnetization directions of the permanent magnets residing at both sides of an interpolar portion opposite to each other, so as to cancel magnetic flux of the armature intersecting that magnetic flux, to control a magnetic field leaking at an end of the magnetic pole, having circumferential magnetic unevenness,
   wherein the electrical rotary machine is configured to meet a relationship, such that $$1.6 \leq \frac{P \times W_{pm}}{R} \leq 1.9$$

where $W_{pm}$ [mm] is a width of the permanent magnet, R [mm] is a radius of the rotor, and P is a pole number.

2. The permanent-magnet reluctance electrical rotary machine as claimed in claim 1, wherein the rotor has eight poles, and the stator has forty-eight slots.

3. A permanent-magnet reluctance electrical rotary machine comprising:
   a stator having a winding as an armature; and
   a rotor including a pair of permanent magnet implanting slots provided in a rotor core at both sides of a magnetic pole configured to produce reluctance torque along a direction of magnetic flux passing through the magnetic pole to produce reluctance torque, and permanent magnets inserted in the permanent magnet implanting slots, respectively, magnetization directions of the permanent magnets residing at both sides of the magnetic pole identical to each other, magnetization directions of the permanent magnets residing at both sides of an interpolar portion opposite to each other, so as to cancel magnetic flux of the armature intersecting that magnetic flux, to control a magnetic field leaking at an end of the magnetic pole, having circumferential magnetic unevenness,
   wherein the electrical rotary machine is configured to meet a relationship, such that $$0.55 \leq \frac{P \times t_{pm}}{R} \leq 0.7$$

where $t_{pm}$ [mm] is a thickness of the permanent magnet, R [mm] is a radius of the rotor, and P is a pole number.

4. The permanent-magnet reluctance electrical rotary machine as claimed in claim 3, wherein the rotor has eight poles, and the stator has forty-eight slots.

* * * * *